United States Patent
Huang et al.

(10) Patent No.: US 12,112,904 B2
(45) Date of Patent: Oct. 8, 2024

(54) TEACHING PENDANT OF AN ELECTROMECHANICAL SYSTEM

(71) Applicant: HIWIN TECHNOLOGIES CORP., Taichung (TW)

(72) Inventors: Yen-Shun Huang, Taichung (TW); Yi-Hung Chen, Taichung (TW); Shun-Kai Chang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 150 days.

(21) Appl. No.: 17/583,535

(22) Filed: Jan. 25, 2022

(65) Prior Publication Data
US 2023/0238193 A1 Jul. 27, 2023

(51) Int. Cl.
*H01H 3/02* (2006.01)
*G05B 9/02* (2006.01)
*H01H 47/00* (2006.01)

(52) U.S. Cl.
CPC ............ *H01H 3/022* (2013.01); *G05B 9/02* (2013.01); *H01H 47/002* (2013.01)

(58) Field of Classification Search
CPC ........ H01H 13/50; H01H 43/00; H01H 43/02; H01H 43/04; H01H 2003/00; H01H 2003/0233; H01H 47/00; H01H 47/002; H01H 47/005; H01H 3/00; H01H 3/02; H01H 3/022; H01H 3/12; H01H 43/06; H01H 43/10; H01H 43/12; H01H 43/24; H01H 19/46; H01H 19/48; H01H 19/50; H01H 19/52; H01H 19/54; H01H 21/30; H01H 13/00; H01H 13/64; G05B 19/04; G05B 19/42; G05B 9/02; B25J 13/00; B25J 19/06; B25J 13/06; B25J 13/081;
(Continued)

(56) References Cited

U.S. PATENT DOCUMENTS

| 6,734,581 B1 | 5/2004 | Griffis |
| 2002/0195883 A1 | 12/2002 | Lazzaro |
| 2010/0117585 A1 | 5/2010 | Fitch et al. |

FOREIGN PATENT DOCUMENTS

| CN | 205043783 U | * | 2/2016 |
| CN | 206178436 U | | 5/2017 |

(Continued)

*Primary Examiner* — Anthony R Jimenez
(74) *Attorney, Agent, or Firm* — MUNCY, GEISSLER, OLDS & LOWE, P.C.

(57) ABSTRACT

The teaching equipment of an electromechanical system provided by the present invention is used to connect an emergency stop loop of electromechanical equipment, including a multi-stage key switch, an enabling switch and a safety control device. The multi-stage key switch is used to switch between a first mode and a second mode. The multi-stage key switch generates a switching signal during switching. The enabling switch is connected to the emergency stop loop. The safety control device is used to receive the switching signal. The safety control device includes a transient emergency stop circuit and a disconnection loop time. The safety control device triggers the emergency stop loop to enter the emergency stop state according to the switching signal. The emergency stop state includes that the transient emergency stop circuit interrupts the emergency stop loop until the disconnection loop time is up.

7 Claims, 3 Drawing Sheets

(58) Field of Classification Search
CPC ..... B25J 13/087; B25J 9/00; B25J 9/16; B25J 9/1674; B25J 9/1656; B25J 9/163
USPC ....................................................... 200/502
See application file for complete search history.

(56) References Cited

FOREIGN PATENT DOCUMENTS

| | | | |
|---|---|---|---|
| CN | 208351321 U | * | 1/2019 |
| CN | 110471320 A | | 11/2019 |
| CN | 111897244 A | | 11/2020 |
| JP | 2007-118141 A | | 5/2007 |
| KR | 10-2012-0098629 A | | 9/2012 |

* cited by examiner

TEACHING PENDANT OF AN ELECTROMECHANICAL SYSTEM

BACKGROUND OF THE INVENTION

1. Field of the Invention

The present invention relates to electromechanical systems, and particularly refers to a teaching pendant of an electromechanical system.

2. Description of the Related Art

As the demand for automated production, handling or other work processes increases, the use of robots is driven. However, the robot may need to stop due to malfunction, failure, change of action or stroke during the operation of the robot. At present, the emergency stop switch of the robot is usually triggered to suspend the action to carry out related maintenance and ensure the safety of related workers.

Robots or electromechanical equipment need to establish an automated or test operation process through the teaching process of the teaching pendant, so that the robot or electromechanical equipment can establish or execute automated operations. However, the emergency stop switch of the current robot and the switches of the teaching pendant operate independently and are not connected by a hardware circuit. Therefore, the operation of the switches of the teaching pendant needs to be operated by software to notify whether the robot enters the emergency stop state.

Furthermore, the operation of the three-stage key switch and the enabling switch of the teaching pendant is to determine the operating position through software to control the operation of the electromechanical equipment. The three-stage key switch is used to switch and select the operating mode. The enabling switch is a three-stage switch. According to the pressing action, it can be divided into the neutral position, pressing and fully releasing. The neutral and pressing correspond to different operating modes. In actual operation, the three-stage key switch or the enabling switch may malfunction or the software may misjudge the pressing action of the enabling switch, causing the electromechanical equipment to not stop running as the three-stage key switch is switched to off or the enabling switch is completely released. Or, when the user is operating the enabling switch, the wrong touch (action) causes the pressing action to switch from neutral position to pressing or releasing, causing the electromechanical equipment to enter continuous operation or stop operation. In this way, the execution of the software after judgment may also be dangerous.

SUMMARY OF THE INVENTION

The present invention has been accomplished under the circumstances in view. It is the main object of the present invention to provide a teaching pendant of an electromechanical system, which connects the switches of the teaching pendant to an emergency stop loop through a hardware circuit to avoid the problem of software misjudgment.

The teaching pendant of the electromechanical system provided by the present invention is used to connect an emergency stop loop of an electromechanical equipment. The teaching pendant comprises a multi-stage key switch, an enabling switch and a safety control device. The multi-stage key switch comprises a first mode and a second mode, and is used to switch between the first mode and the second mode. The multi-stage key switch generates a switching signal when switching. The enabling switch connects the emergency stop loop. The safety control device is connected to the multi-stage key switch and used to receive the switching signal of the multi-stage key switch. The safety control device comprises a transient emergency stop circuit and a disconnection loop time. The transient emergency stop circuit connects the emergency stop loop. The safety control device triggers the emergency stop loop to enter an emergency stop state according to the switching signal. The emergency stop state comprises that the transient emergency stop circuit interrupts the emergency stop loop until the disconnection loop time is up.

In this way, the multi-stage key switch of the teaching pendant of the electromechanical system of the present invention can trigger the emergency stop state through the safety control device when switching, and the enabling switch can also interrupt the emergency stop loop to trigger the emergency stop signal to improve the safety and reliability of the electromechanical equipment.

The detailed structure, characteristics and production method of teaching pendant of the electromechanical system will be described in the following preferred embodiment. However, it should be understood that the preferred embodiment and drawings described below are only illustrative, and should not be used to limit the scope of the patent application of the present invention.

DETAILED DESCRIPTION OF THE INVENTION

In the following, the technical content and features of the present invention will be described in detail by means of several examples listed in conjunction with the drawings. The terms "connected" or "electrically connected" mentioned in the content of this specification are only terms that normally form electrical conduction or connection, and are not intended to limit the scope of claims.

Figure 1:
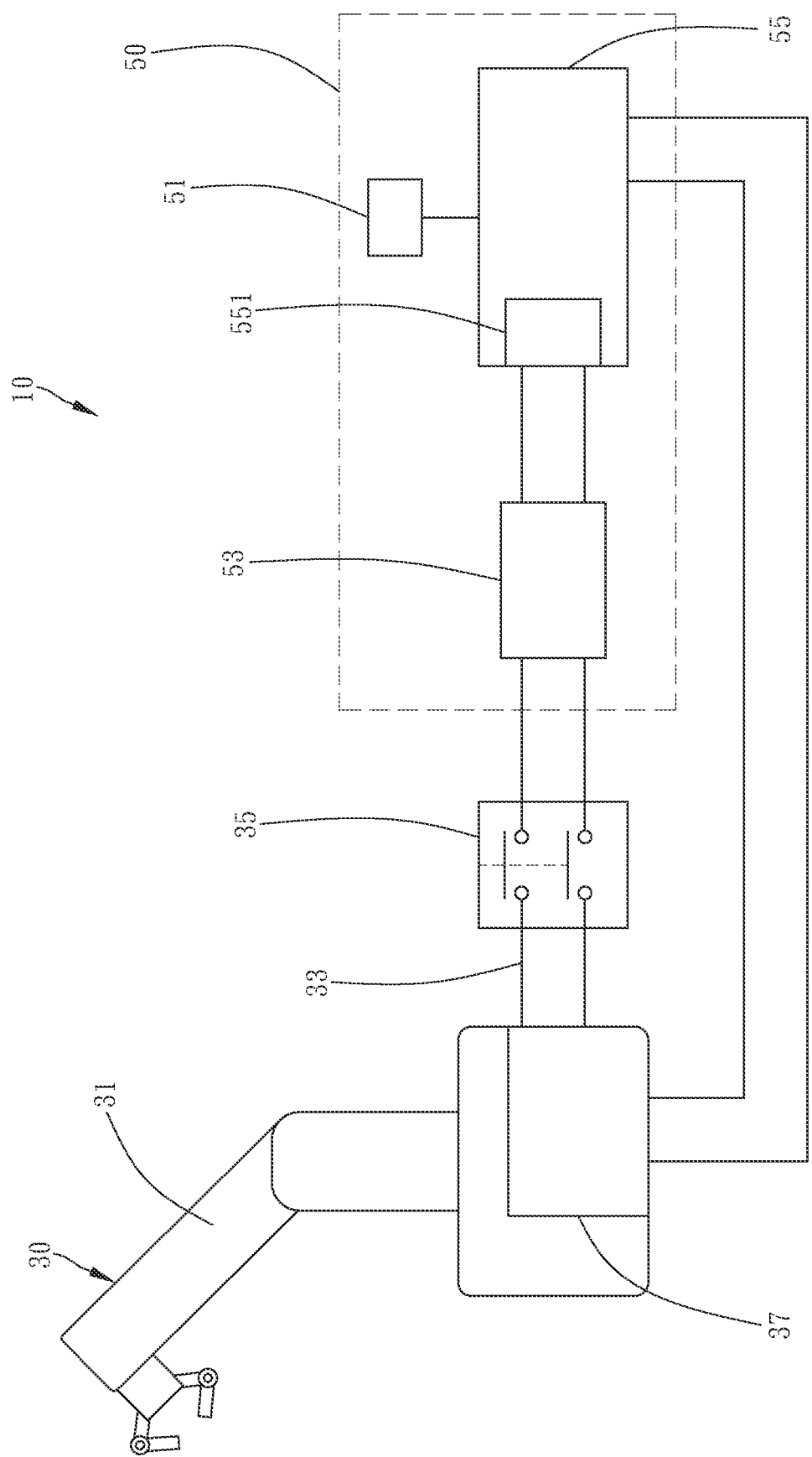
FIG. 1 is a schematic diagram of an embodiment of the electromechanical system of the present invention.

In order to illustrate the technical features of the present invention in detail, the following preferred embodiment is given in conjunction with the drawings to illustrate the following, where:

As shown in FIG. 1, this figure is a schematic diagram of the electromechanical system 10 of the present invention.

The electromechanical system 10 comprises an electromechanical equipment and a teaching pendant 50. The teaching pendant 50 is connected to the electromechanical equipment 30 and used to control the operation of the electromechanical equipment 30. The electromechanical equipment 30 comprises a robotic arm 31 and an emergency stop loop 33. The emergency stop loop 33 is connected to the robotic arm 31, and comprises an emergency stop switch 35 and a safety relay module 37. The emergency stop switch 35 can trigger the emergency stop loop 33 to enter the emergency stop state, so that the robotic arm 31 can interrupt or suspend the operation to achieve the safety protection function. The safety relay module 37 can stop, energize and reset the robotic arm 31.

The teaching pendant 50 is connected to the electromechanical equipment 30 and drives the operation of the electromechanical equipment 30. The operation includes adjusting or setting the operation process, action and status of the electromechanical equipment 30.

The teaching pendant 50 comprises a multi-stage key switch 51, an enabling switch 53 and a safety control device 55. The multi-stage key switch 51 comprises a first mode and a second mode, and is used to switch between the first mode or the second mode. The multi-stage key switch 51 generates a switching signal during switching. The generation of the switching signal is the first mode to second mode, or the second mode to first mode.

In this embodiment, the first mode can be a manual process or a teaching process, and the second mode can be an automatic (AUTO) process. The manual process can be divided into the first manual mode and the second manual mode according to the operating speed. The first manual mode can be used as point teaching, trial implementation and program creation of the electromechanical equipment 30. The second manual mode can be used to view the process of electromechanical equipment 30. The automatic process usually runs in automated production or operations to allow the electromechanical equipment 30 to perform automated operations. In other embodiments, the multi-stage key switch 51 may have more modes, such as an OFF mode or a cooperative mode.

The enabling switch 53 is connected to the emergency stop loop 33 so that the enabling switch 53 and the emergency stop loop 33 are linked.

The safety control device 55 is connected to the multi-stage key switch 51 and used to receive the switching signal of the multi-stage key switch 51. The safety control device 55 can detect the switching of the multi-stage key switch 51. When the multi-stage key switch 51 is switched, the safety control device 55 can determine the switching of the multi-stage key switch 51 and switch the mode correspondingly according to the switching signal. When the multi-stage key switch 51 is not switched, the safety control device 55 can detect the current mode corresponding to the multi-stage key switch 51.

The safety control device 55 comprises a transient emergency stop circuit 551 and a disconnection loop time. The transient emergency stop circuit 551 is connected to the emergency stop loop 33. The safety control device 55 triggers the emergency stop loop to enter an emergency stop state according to the switching signal. The emergency stop state includes the transient emergency stop circuit 551 interrupts the emergency stop loop 33 and does not reconnect the emergency stop loop 33 until the disconnection loop time is up. In this way, the electromechanical system 10 will be in the emergency stop state. In the emergency stop state, the electromechanical equipment 30 cannot be operated or excited.

The disconnection loop time is for the electromechanical equipment 30 to recognize that the emergency stop loop 33 has been triggered by the emergency stop state. Therefore, the disconnection loop time is related to the sensitivity of the electronic components of the electromechanical equipment 30. In this embodiment, the disconnection loop time is about 0.8 seconds. In other embodiments, the disconnection loop time can be longer or shorter, and the shorter one needs to refer to the response sensitivity of the electronic components to avoid triggering the emergency stop state, but the electromechanical equipment 30 does not recognize that the emergency state has been activated. Longer needs to consider wasting the waiting time of the electromechanical equipment 30.

Subsequently, the emergency stop state can be cleared by the reset procedure of the emergency stop loop 33. After the emergency stop state is cleared, the electromechanical equipment 30 can be restarted or energized.

Figure 2:
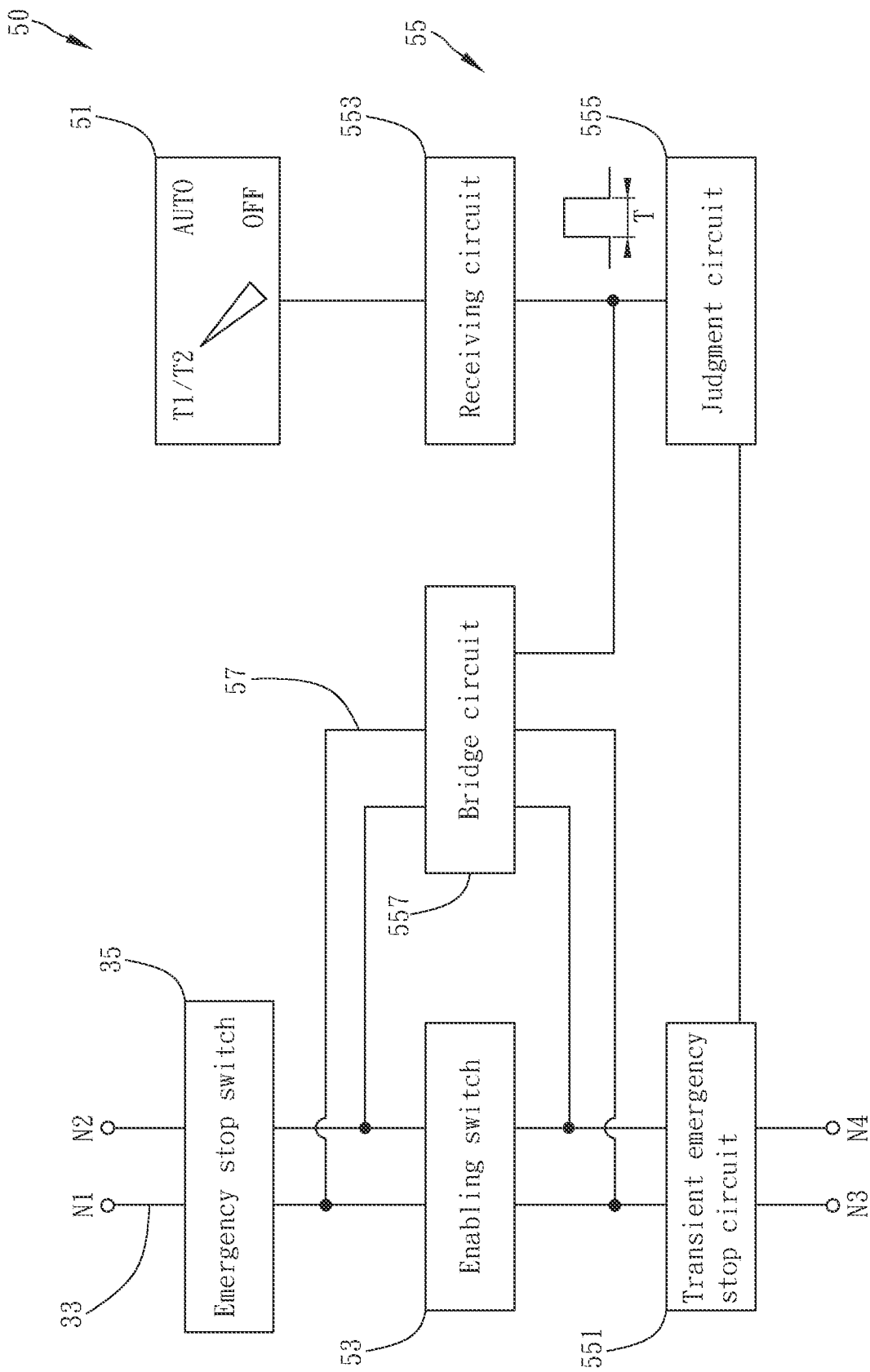
FIG. 2 is a block diagram of the emergency stop switch, emergency stop loop and teaching pendant in FIG. 1.

As shown in FIG. 2, the safety control device 55 further comprises a receiving circuit 553, a judgment circuit 555 and a bridge circuit 557. The receiving circuit 553 is connected to the multi-stage key switch 51, and receives the switching signal. The receiving circuit 553 can determine the switching signal through the composition of logic gate elements, and adjust the disconnection loop time. In this embodiment, the disconnection loop time corresponds to the conduction time T of a pulse wave. Therefore, the receiving circuit 553 can achieve the purpose of adjusting the time by adjusting the conduction time of the pulse wave.

The judgment circuit 555 is connected to the receiving circuit 553, the transient emergency stop circuit 551 and the bridge circuit 557, and judges that the switching signal corresponds to the first mode or the second mode. In addition, when the multi-stage key switch 51 is not switched, the judgment circuit 555 can also determine the current mode corresponding to the multi-stage key switch 51.

The bridge circuit 557 connects the emergency stop loop 33 and the enabling switch 53, and has a bypass relationship with the enabling switch 53. When the multi-stage key switch 51 is in the second mode, the judgment circuit 555 triggers the bridge circuit 557, so that the emergency stop switch 53 and the bridge circuit 557 form a bypass circuit 57. The bypass circuit 57 is to bypass the enabling switch 53, and make the electromechanical system perform an automatic process, that is, bypasses the manual process. The four endpoints N1-N4 of the emergency stop loop 33 are the safety relay module 37 connected to the electromechanical equipment 31 of FIG. 1.

Figure 3:
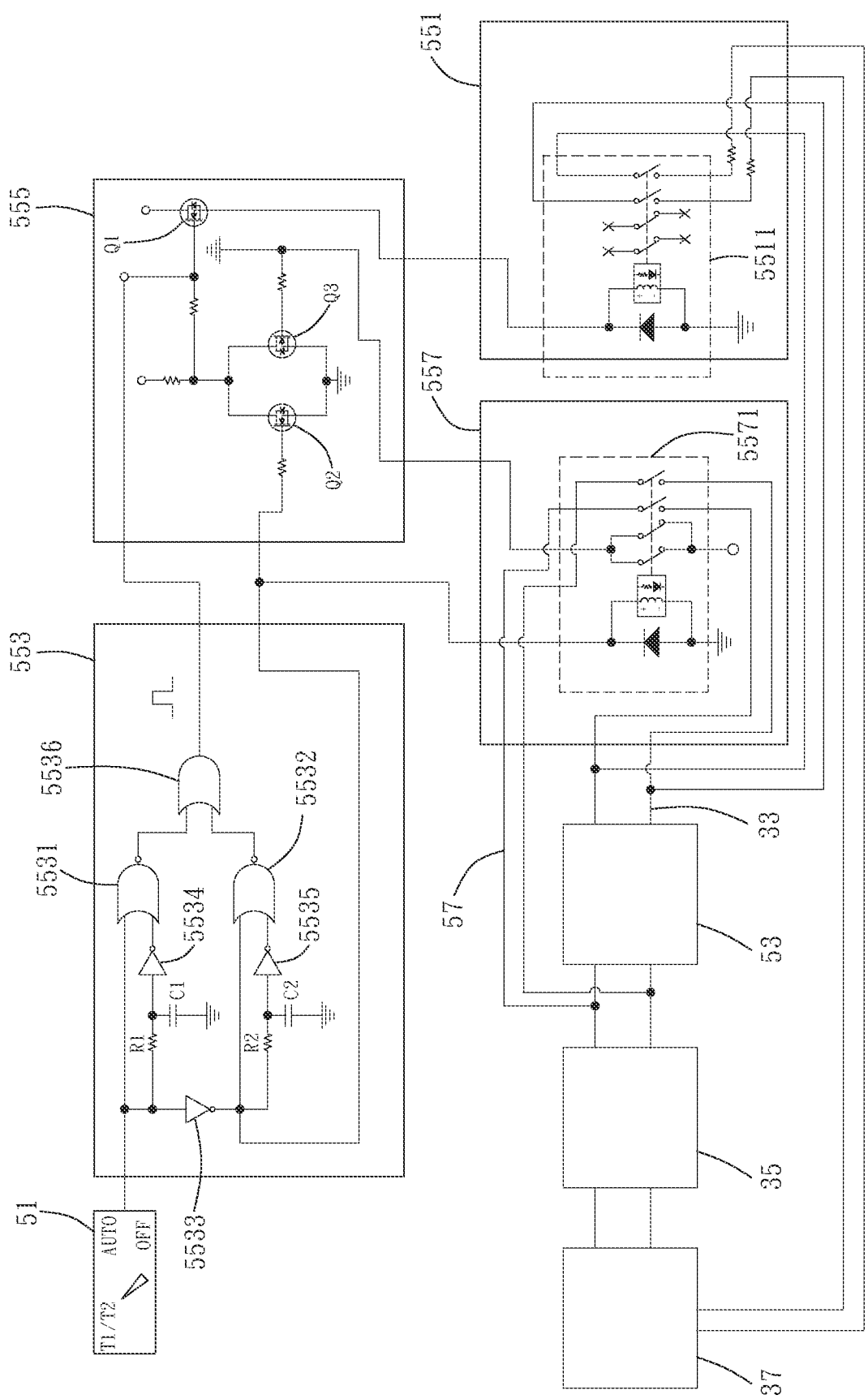
FIG. 3 is a continuation of FIG. 2 and shows the circuit diagram of the receiving circuit, judgment circuit, transient emergency stop switch and bridge circuit.

As shown in FIG. 3, the receiving circuit 553 comprises two NOR gates 5531, 5532, three NOT gates 5533, 5534, 5535, one OR gate 5536, two resistors R1, R2 and two capacitors C1, C2. The judgment circuit 555 comprises a first transistor Q1, a second transistor Q2 and a third transistor Q3. The transient emergency stop circuit 551 and bridge circuit 557 are respectively a relay 5511 and 5571.

The input of the NOT gate 5533 is connected to the input of the multi-stage key switch 51 and the NOR gate 5531. The resistor R1 and capacitor C1 are electrically connected to the input terminals of the two NOT gates 5533 and 5534. The output of the NOT gate 5534 is connected to the input of the NOR gate 5531. The output of the NOT gate 5533 is connected to the input of the NOR gate 5532. The resistor R2 and the capacitor C2 are electrically connected to the output terminal of the NOT gate 5533 and the input terminal of the NOT gate 5535. The output of the NOT gate 5535 is connected to the input of the NOR gate 5532. The output terminals of the two NOR gates 5531 and 5532 are connected to the input terminal of the OR gate 5536. The output terminal of the OR gate 5536 is connected to the gate of the first transistor Q1.

The source of the first transistor Q1 is connected to the power supply. The drain of the first transistor Q1 is connected to the relay 5511 of the transient emergency stop circuit 551 to control the switching operation of the relay 5511. The normally open contact of the relay 5511 is connected in series with the emergency stop loop 33.

The gate of the second transistor Q2 is connected to the output terminal of the NOT gate 5533, the source of the second transistor Q2 is connected to the ground terminal, and the drain of the second transistor Q2 is electrically connected to the drain of the third transistor Q3 and the gate of the first transistor Q1 and the power supply. The source of the third transistor Q3 is connected to the ground terminal. The gate of the third transistor Q3 is electrically connected to the ground terminal and the normally closed contact of the relay 5571. The normally closed contact of the relay 5571 is connected to the power supply. The normally open contact of the relay 5571 is electrically connected to the emergency stop loop 33, and forms a bypass relationship with the enabling switch 53. The relay 5571 is connected to the gate of the second transistor Q2 to the output of the NOT gate 5533 to control the switching operation of the relay 5571 according to the second mode of the multi-stage key switch 51.

In this embodiment, the multi-stage key switch 51 switches from the second mode to the first mode, so that the switching signal generates a pulse wave and triggers at a higher level (for example, 1), so that the output terminal of the OR gate 5536 outputs a switching signal to trigger the first transistor Q1 to turn off, and the normally open contact of the relay 5511 is opened, and the emergency stop loop 33 is disconnected to trigger the emergency stop state. The disconnection time is the same as the disconnection loop time, that is, the pulse wave returns from the high level to a low level (for example, 0). The disconnection loop time is adjusted by adjusting the parameters of resistors R1, R2 and capacitors C1, C2. When the disconnection loop time is up, the first transistor Q1 is turned on, and the normally open contact of the relay 5511 is closed, and the emergency stop loop 33 is turned on.

When the multi-stage key switch 51 switches from the first mode to the second mode, the switching signal generates a pulse wave and triggers at a lower level (such as 0), so that the output terminal of the OR gate 5536 outputs a switching signal to trigger the first transistor Q1 to turn off, and the normally open contact of the relay 5511 is opened and the emergency stop loop 33 is disconnected to trigger the emergency stop state. Until the disconnection loop time expires, the first transistor Q1 is turned on, and the normally open contact of the relay 5511 is closed, and the emergency stop loop 33 is turned on. When the switching signal pulse is triggered at a low level, the output terminal of the NOT gate 5533 will output a high level signal (such as 1) to trigger the second transistor Q2 to turn on, the third transistor Q3 to turn off and the relay 5571 to operate, so that the normally open contact of the relay 5571 is closed and the bypass circuit 57 is turned on.

When the multi-stage key switch 51 is not switched, that is, when the previous operation mode is maintained, the switching signal has no relatively high and low level changes and does not generate pulses. The switching signal output from the output of the OR gate 5536 will trigger the first transistor Q1 to turn on, so it will not trigger the emergency stop state.

In other embodiments, each circuit allows those skilled in the art to use other components and the number of components to implement related circuits through the above-mentioned logic or switch description, so it is not limited to the circuit diagram of FIG. 3.

Although in second mode, the operation of the enabling switch 53 will not trigger the emergency stop state, but when the multi-stage key switch 51 is switched or the emergency stop switch 31 is triggered, the emergency stop state can still be triggered by the bypass circuit 57 formed by the emergency stop switch 31, the bridge circuit 557 and the transient emergency stop circuit 551.

When the multi-stage key switch 51 is in the first mode, the bridge circuit 557 does not work. The enabling switch 53 comprises an operating mode and a disconnection mode. Operating mode, such as pressing in the neutral position. Disconnection mode, such as fully releasing and fully pressing position. When the enabling switch 53 is switched from the operating mode to the disconnection mode, the enabling switch 53 interrupts the emergency stop loop 33 and triggers the emergency stop state to stop the electromechanical equipment from running to avoid user misoperation and danger.

In summary, the teaching pendant of the present invention can trigger the emergency stop state when the emergency stop loop is interrupted, so as to realize the hardware triggering the emergency stop state, so as to improve the safety and reliability of the use of the electromechanical equipment.

Through the foregoing embodiment, it is illustrated that those skilled in the art can understand the technology and purpose of the teaching pendant of the present invention. Therefore, the above configuration of the teaching pendant can also be changed in the hardware through the number or arrangement of logical components to achieve the same technology and purpose. Therefore, the teaching pendant described in the embodiment is only the description in this embodiment, and is not intended to limit the scope of claims.

What is claimed is:

1. A teaching pendant, connected to an emergency stop loop of electromechanical equipment, comprising:
   a multi-stage key switch comprising a first mode and a second mode, and being used to switch between said first mode and said second mode, said multi-stage key switch generating a switching signal when switching;
   an enabling switch connecting to said emergency stop loop of the electromechanical equipment; and
   a safety control device connected to said multi-stage key switch and used to receive said switching signal of said multi-stage key switch, said safety control device comprising a transient emergency stop circuit and a disconnection loop time, said transient emergency stop circuit connecting said emergency stop loop of the electromechanical equipment, said safety control device triggering said emergency stop loop to enter an emergency stop state according to said switching signal, during said emergency stop state said transient emergency stop circuit interrupts said emergency stop loop of the electromechanical equipment until the disconnection loop time is completed.

2. The teaching pendant as claimed in claim 1, wherein when said multi-stage key switch is in said first mode, said enabling switch comprises an operating mode and a disconnection mode; when said operating mode is switched to said disconnection mode, said enabling switch interrupts said emergency stop loop so that said emergency stop loop enters said emergency stop state.

3. The teaching pendant as claimed in claim 1, wherein said first mode comprises a first process for point teaching, trial implementing and program creating of the electromechanical equipment, said second mode comprises a second process for performing automated operations in the electromechanical equipment.

4. The teaching pendant as claimed in claim 1, wherein said emergency stop loop comprises an emergency stop switch.

5. The teaching pendant as claimed in claim 1, wherein said safety control device comprises a receiving circuit and a judgment circuit, said receiving circuit receiving said switching signal, said judgment circuit being connected to said receiving circuit and said transient emergency stop circuit and judging that said switching signal corresponds to said first mode or said second mode.

6. The teaching pendant as claimed in claim 5, wherein said receiving circuit is used to adjust said disconnection loop time.

7. The teaching pendant as claimed in claim 5, wherein said emergency stop loop comprises an emergency stop switch, said safety control device further comprises a bridge circuit connected to said emergency stop loop, said enabling switch and said judgment circuit, and is connected with said enabling switch in parallel, in said second mode, said emergency stop switch and said bridge circuit forming a bypass circuit.

* * * * *